United States Patent
Suzuki

(10) Patent No.: US 9,674,383 B2
(45) Date of Patent: Jun. 6, 2017

(54) IMAGE PROCESSING APPARATUS AND NON-TRANSITORY STORAGE MEDIUM STORING INSTRUCTIONS TO BE EXECUTED BY THE IMAGE PROCESSING APPARATUS

(71) Applicant: BROTHER KOGYO KABUSHIKI KAISHA, Nagoya-shi, Aichi-ken (JP)

(72) Inventor: Nobuhiko Suzuki, Toyokawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/054,200

(22) Filed: Feb. 26, 2016

(65) Prior Publication Data
US 2016/0255227 A1     Sep. 1, 2016

(30) Foreign Application Priority Data
Feb. 27, 2015  (JP) .................. 2015-038365

(51) Int. Cl.
*H04N 1/00*     (2006.01)

(52) U.S. Cl.
CPC ....... *H04N 1/00687* (2013.01); *H04N 1/0044* (2013.01); *H04N 1/0057* (2013.01); *H04N 1/00244* (2013.01); *H04N 1/00411* (2013.01); *H04N 1/00477* (2013.01); *H04N 1/00771* (2013.01); *H04N 1/00795* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2005/0047813 A1* | 3/2005 | Hosoi | G03G 15/5012 399/87 |
| 2007/0013562 A1 | 1/2007 | Nagasawa | |
| 2007/0216968 A1 | 9/2007 | Enomoto | |
| 2007/0230985 A1 | 10/2007 | Funahashi | |

(Continued)

FOREIGN PATENT DOCUMENTS

| | | |
|---|---|---|
| JP | 2007-028179 A | 2/2007 |
| JP | 2007-251781 A | 9/2007 |
| JP | 2007-274149 A | 10/2007 |

*Primary Examiner* — Fan Zhang
(74) *Attorney, Agent, or Firm* — Scully, Scott, Murphy & Preser, PC

(57) ABSTRACT

An image processing apparatus includes a recording device, a reading device, a first sheet supporter, a second sheet supporter, and a connection device. A display displays first notification information when a switch of the first sheet supporter, the second sheet supporter, or the connection device from the OFF state to the ON state is detected. The first notification information has object identification information identifying a first object for which the switch is detected, and a second object different from the first object among the first sheet supporter, the second sheet supporter, and the connection device. The display displays an acceptance image for accepting an instruction of execution of a processing to be executed using the first object and the second object, when a switch of a state of the second object from the OFF state to the ON state is detected, with the first notification information being displayed.

12 Claims, 13 Drawing Sheets

(56) References Cited

U.S. PATENT DOCUMENTS

| | | | | |
|---|---|---|---|---|
| 2008/0117480 A1* | 5/2008 | Huang | ............... | H04N 1/00681 358/474 |
| 2011/0273735 A1* | 11/2011 | Koura | .................. | G03G 15/502 358/1.13 |
| 2012/0235960 A1* | 9/2012 | Maekawa | .......... | H04N 1/00411 345/204 |
| 2014/0126018 A1* | 5/2014 | Sugimoto | ............... | G06F 3/013 358/1.15 |
| 2015/0215481 A1* | 7/2015 | Faust | ................ | H04N 1/00225 358/1.13 |
| 2015/0326744 A1* | 11/2015 | Onuki | ............... | H04N 1/00737 358/1.2 |

* cited by examiner

FIG.6

| | State | | | | Candidate | | |
|---|---|---|---|---|---|---|---|
| | FB or ADF | USB I/F | Manual Tray | Internal Tray | Copy Processing | Media Print Processing | Scan to Media Processing |
| 1 | OFF | OFF | OFF | OFF | Inexecutable | Inexecutable | Inexecutable |
| 2 | ON | OFF | OFF | OFF | Requiring turning Internal or Manual Tray to ON | Inexecutable | Requiring turning USB I/F to ON |
| 3 | OFF | ON | OFF | OFF | Inexecutable | Requiring turning Internal or Manual Tray to ON | Requiring turning FB or ADF to ON |
| 4 | ON | ON | OFF | OFF | Requiring turning Internal or Manual Tray to ON | Requiring turning Internal or Manual Tray to ON | Executable |
| 5 | OFF | OFF | ON | OFF | Requiring turning FB or ADF to ON | Requiring turning USB I/F to ON | Inexecutable |
| 6 | ON | OFF | ON | OFF | Executable | Requiring turning USB I/F to ON | Requiring turning USB I/F to ON |
| 7 | OFF | ON | ON | OFF | Requiring turning FB or ADF to ON | Executable | Requiring turning FB or ADF to ON |
| 8 | ON | ON | ON | OFF | Executable | Executable | Executable |
| 9 | OFF | OFF | OFF | ON | Requiring turning FB or ADF to ON | Requiring turning USB I/F to ON | Inexecutable |
| 10 | ON | OFF | OFF | ON | Executable | Requiring turning USB I/F to ON | Requiring turning USB I/F to ON |
| 11 | OFF | ON | OFF | ON | Requiring turning FB or ADF to ON | Executable | Requiring turning FB or ADF to ON |
| 12 | ON | ON | OFF | ON | Executable | Executable | Executable |
| 13 | OFF | OFF | ON | ON | Requiring turning FB or ADF to ON | Requiring turning USB I/F to ON | Inexecutable |
| 14 | ON | OFF | ON | ON | Executable | Requiring turning USB I/F to ON | Requiring turning USB I/F to ON |
| 15 | OFF | ON | ON | ON | Requiring turning FB or ADF to ON | Executable | Requiring turning FB or ADF to ON |
| 16 | ON | ON | ON | ON | Executable | Executable | Executable | ably improved operability and to a non-transitory storage medium storing a plurality of instructions to be executed by a processor of the image processing apparatus.

IMAGE PROCESSING APPARATUS AND NON-TRANSITORY STORAGE MEDIUM STORING INSTRUCTIONS TO BE EXECUTED BY THE IMAGE PROCESSING APPARATUS

CROSS REFERENCE TO RELATED APPLICATION

The present application claims priority from Japanese Patent Application No. 2015-038365, which was filed on Feb. 27, 2015, the disclosure of which is herein incorporated by reference in its entirety.

BACKGROUND

Technical Field

The following disclosure relates to an image processing apparatus configured to execute a plurality of image processings and to a non-transitory storage medium storing a plurality of instructions to be executed by a processor of the image processing apparatus.

Description of the Related Art

There is known an image processing apparatus including: a recording device configured to record an image on a recording sheet based on image data; a reading device configured to read an image on a document; and a connection device to which a storage device for storing image data is connected. This image processing apparatus is capable of executing various processings including: a copy processing in which the reading device reads an image on a document to create image data, and the recording device records the image on a printing sheet based on the created image data; a media print processing in which the recording device records an image on the printing sheet based on image data stored in the storage device, e.g., a USB memory, connected to the connection device; and a Scan-to-Media processing in which the reading device reads an image on a document to create image data, and the created image data is stored into the USB memory connected to the connection device. In such an image processing apparatus, there has been developed a technique for estimating which processing a user desires to execute among a plurality of processings on the basis of states of objects such as the recording device, the reading device, and the connection device.

SUMMARY

Operability of the conventional image processing apparatus is improved in some degree by estimation of which processing the user desires to execute among the plurality of processings. However, the conventional image processing apparatus uses only static information such as the presence or absence of a document and the presence or absence of a media. Thus, the conventional image processing apparatus in some case cannot appropriately estimate which processing the user desires to execute, leading to complicated operations for the user on the contrary. Accordingly, an aspect of the disclosure relates to an image processing apparatus with appropriately improved operability and to a non-transitory storage medium storing a plurality of instructions to be executed by a processor of the image processing apparatus.

In one aspect of the disclosure, an image processing apparatus includes: a recording device configured to record an image on a recording sheet based on image data; a reading device configured to read an image on a document; a first sheet supporter configured to support the recording sheet; a first detector configured to detect an ON state as a state of the first sheet supporter when the recording sheet is present on the first sheet supporter, the first detector being configured to detect an OFF state as the state of the first sheet supporter when the recording sheet is absent on the first sheet supporter; a second sheet supporter configured to support the document; a second detector configured to detect an ON state as a state of the second sheet supporter when the document is present on the second sheet supporter, the second detector being configured to detect an OFF state as the state of the second sheet supporter when the document is absent on the second sheet supporter; a connection device configured to detect an ON state as a state of the connection device when a storage device configured to store image data is connected to the connection device, the connection device being configured to detect an OFF state as the state of the connection device when the storage device is not connected to the connection device; a display; and a controller. The controller is configured to perform: displaying first notification information on the display when the controller detects one of (i) a switch of the state of the first sheet supporter, which is detected by the first detector, from the OFF state to the ON state, (ii) a switch of the state of the second sheet supporter, which is detected by the second detector, from the OFF state to the ON state, and (iii) a switch of the state of the connection device from the OFF state to the ON state, the first notification information containing object identification information that identifies a first object and a second object, the first object being an object for which the switch is detected among the first sheet supporter, the second sheet supporter, and the connection device, the second object being an object different from the first object among the first sheet supporter, the second sheet supporter, and the connection device; and displaying an acceptance image on the display when a switch of a state of the second object from the OFF state to the ON state is detected in a state in which the first notification information is displayed on the display, the controller being capable of accepting an instruction of execution of a processing to be executed using the first object and the second object while the acceptance image is being displayed on the display.

In another aspect of the disclosure, a non-transitory storage medium stores a plurality of instructions to be executed by a processor of an image processing apparatus. The image processing apparatus includes: a recording device configured to record an image on a recording sheet based on image data; a reading device configured to read an image on a document; a first sheet supporter configured to support the recording sheet; a first detector configured to detect an ON state as a state of the first sheet supporter when the recording sheet is present on the first sheet supporter, the first detector being configured to detect an OFF state as the state of the first sheet supporter when the recording sheet is absent on the first sheet supporter; a second sheet supporter configured to support the document; a second detector configured to detect an ON state as a state of the second sheet supporter when the document is present on the second sheet supporter, the second detector being configured to detect an OFF state as the state of the second sheet supporter when the document is absent on the second sheet supporter; a connection device configured to detect an ON state as a state of the connection device when a storage device configured to store image data is connected to the connection device, the connection device being configured to detect an OFF state as the state of the connection device when the storage device is not connected to the connection device; and a display. The plurality of instructions, when executed by the processor, causing the image processing apparatus to perform: displaying first notification information on the display when the controller detects one of (i) a switch of the state of the first sheet supporter, which is detected by the first detector, from the OFF state to the ON state, (ii) a switch of the state of the second sheet supporter, which is detected by the second detector, from the OFF state to the ON state, and (iii) a switch of the state of the connection device from the OFF state to the ON state, the first notification information containing object identification information that identifies a first object and a second object, the first object being an object for which the switch is detected among the first sheet supporter, the second sheet supporter, and the connection device, the second object being an object different from the first object among the first sheet supporter, the second sheet supporter, and the connection device; and displaying an acceptance image on the display when a switch of a state of the second object from the OFF state to the ON state is detected in a state in which the first notification information is displayed on the display, the image processing apparatus being capable of accepting an instruction of execution of a processing to be executed using the first object and the second object while the acceptance image is being displayed on the display.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which:

FIG. 6 is a view conceptually illustrating a relationship between states of objects and executable processings;

DETAILED DESCRIPTION OF THE EMBODIMENT

Configuration of Communication System

Figure 1:
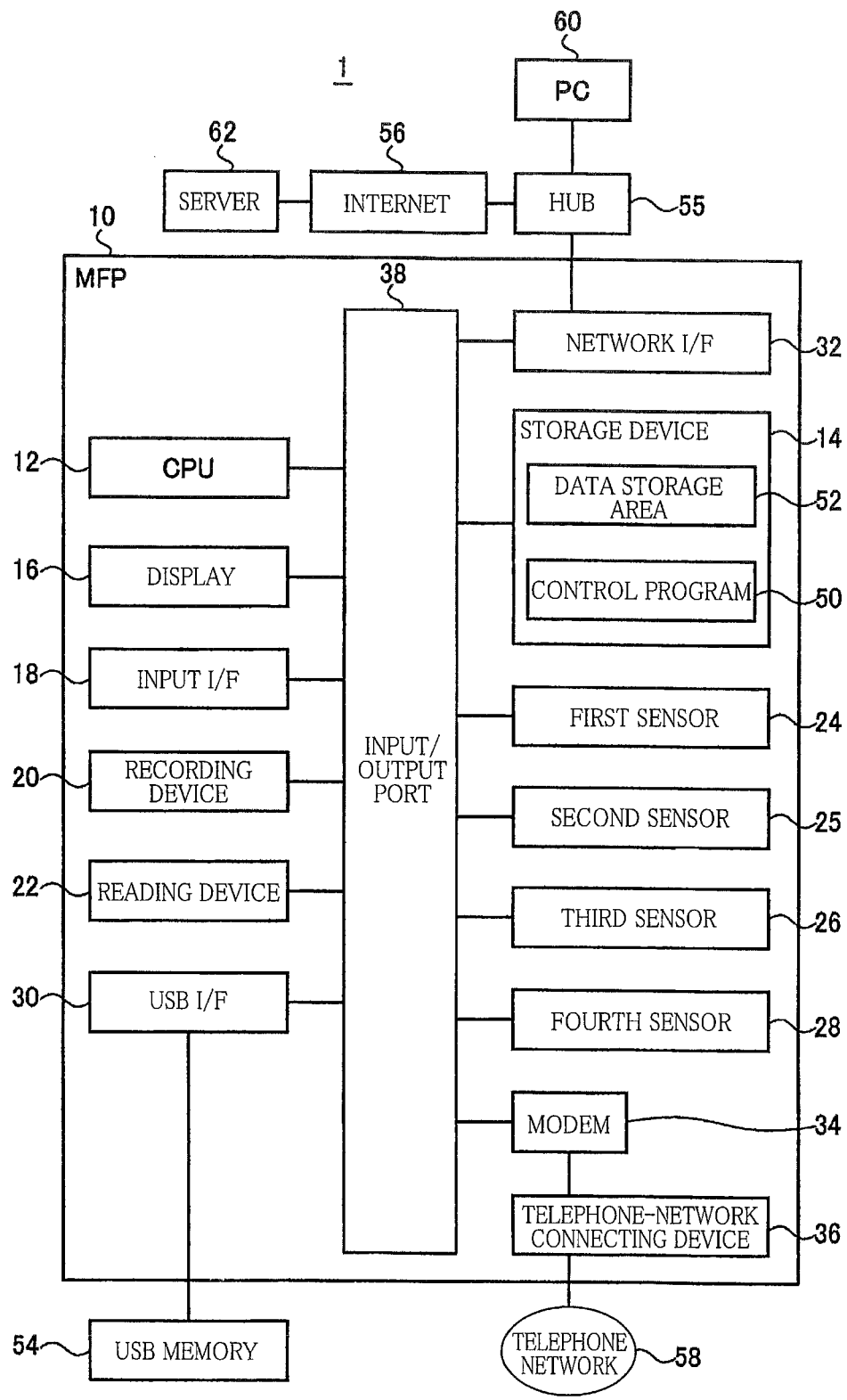
FIG. 1 is a block diagram illustrating a communication system.

Hereinafter, there will be described one embodiment by reference to the drawings. FIG. 1 illustrates a communication system 1 according to one embodiment. The communication system 1 includes a multi-function peripheral (MFP) 10 as one example of an image processing apparatus, a personal computer (PC) 60, and a server 62.

The MFP 10 includes: a CPU 12 as one example of a controller and a computer; a storage device 14; a display 16; an input interface 18; a recording device 20, a reading device 22; a first sensor 24 as one example of a first detector; a second sensor 25 as another example of the first detector; a third sensor 26 as one example of a second detector; a fourth sensor 28 as another example of the second detector; a USB interface 30 as one example of a connection device and an object; a network interface 32; a modem 34; and a telephone-network connecting device 36. These devices are communicable with each other via an input/output port 38.

The display 16 has a display surface for displaying various functions of the MFP 10. Examples of the display include a liquid crystal display (LCD), an organic EL display, and a plasma display. The input interface 18 may be a touchscreen provided integrally on the display 16. The input interface 18 accepts user operations on buttons displayed on the display 16. Other examples of the input interface 18 include physical keys.

The recording device 20 is a printing mechanism in the form of an ink-jet head, for example. The CPU 12 controls a sheet conveying mechanism, not shown, to convey a printing sheet placed on a manual tray (as one example of a first sheet supporter and another example of the object), not shown, or a printing sheet stored in an internal tray (as another example of the first sheet supporter and another example of the object), not shown, to the recording device 20, and the CPU outputs drive signals to the recording device 20. In the case where the recording device 20 is an ink-jet head, the input drive signals cause the ink-jet head to eject ink from its nozzles to print an image on the printing sheet.

The reading device 22 scans and reads an image formed on a document placed (set) on a flat bed (as one example of a second sheet supporter and another example of the object), not shown, or an automatic document feeder or ADF (as another example of the second sheet supporter and another example of the object), not shown. Examples of the reading device 22 include a CCD image sensor and a contact image sensor.

The first sensor 24 detects whether the printing sheet is present (placed or set) on the manual tray. The second sensor 25 detects whether the printing sheet is present (stored or set) in the internal tray. The third sensor 26 detects whether the document is present (placed or set) on the flat bed. The fourth sensor 28 detects whether the document is present (placed or set) on the ADF.

The CPU 12 executes processings according to a control program 50 stored in the storage device 14. The control program 50 is a program for the CPU 12 to execute various functions in the MFP 10.

It is noted that the storage device 14 is constituted by a combination of a random access memory (RAM), a read only memory (ROM), a flash memory, a hard disk (HDD), a buffer provided for the CPU 12, and other similar devices. The storage device 14 has a data storage area 52. The data storage area 52 stores various kinds of data including data required for execution of the scan program 50.

A USB memory 54 as one example of a storage is connectable to the USB interface 30. In the state in which the USB memory 54 is connected to the USB interface 30, the MFP 10 can store data into the USB memory 54 and can output data stored in the USB memory 54. The network interface 32 is a device for communicating with external devices and is connected to a personal computer (PC) 60 via a hub 55 serving as a router. The network interface 32 is connected to the server 62 via the hub 55 and the Internet 56. These configurations allow the MFP 10 to perform data communication with the PC 60 and the server 62 via the network interface 32.

The modem 34 converts document data into a signal transmittable to a telephone network 58 and transmits the signal to the telephone network 58 via the telephone-network connecting device 36 using a facsimile function. The modem 34 also receives a signal from the telephone network 58 via the telephone-network connecting device 36 to decode the signal into document data.

Execution of Processings on MFP 10

Figure 2:
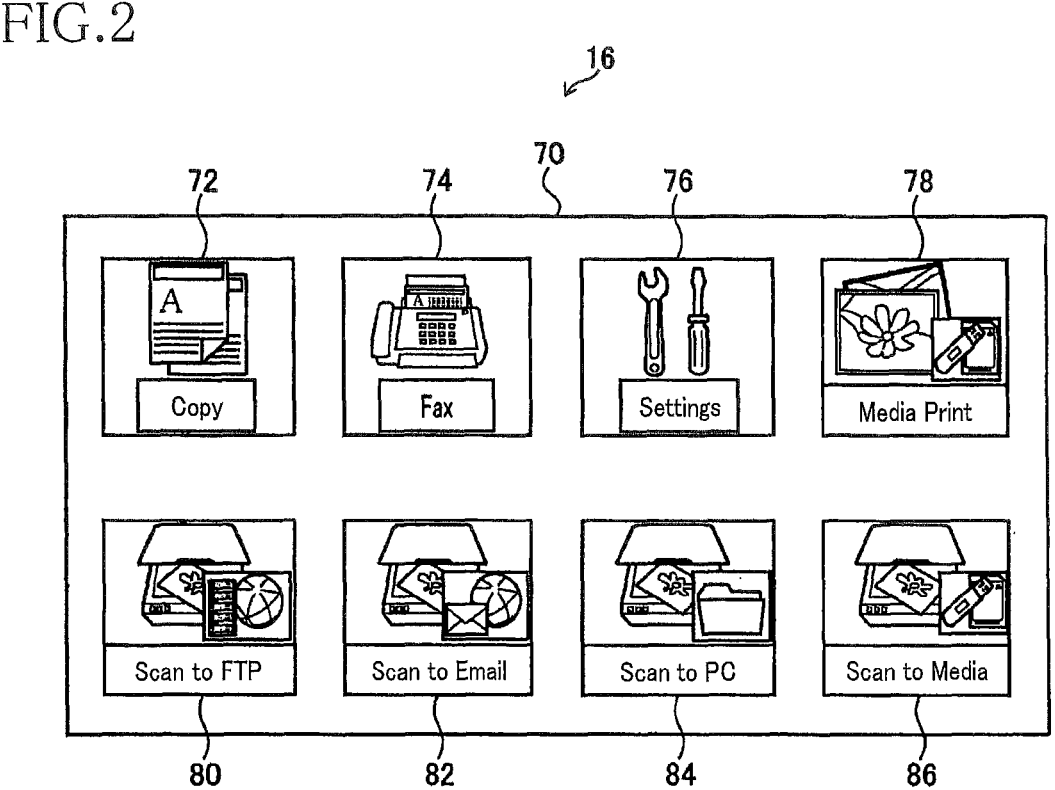
FIG. 2 is a view illustrating a menu screen.

The MFP 10 can execute various processings such as a copy processing and a scan processing. Specifically, a menu screen 70 illustrated in FIG. 2 is normally displayed on the display 16. The menu screen 70 contains a copy button 72, a facsimile button 74, a setting button 76, a media print button 78, a Scan-to-FTP button 80, a Scan-to-Email button 82, a Scan-to-PC button 84, and a Scan-to-Media button 86.

The copy button 72 is for selection of the copy processing in which the MFP 10 reads an image formed on a document placed on the flat bed or the ADF to create image data and records the image based on the created image data. The facsimile button 74 is for selection of a facsimile processing. The setting button 76 is for selection of change of a setting. The media print button 78 is for selection of a processing for recording an image based on image data stored in the USB memory 54. It is noted that this processing may be hereinafter referred to as media print processing. The Scan-to-FTP button 80 is for selection of a Scan-to-FTP processing in which the MFP 10 reads an image formed on a document placed on the flat bed or the ADF to create image data and transmits the created image data to the server 62. The Scan-to-Email button 82 is for selection of a Scan-to-Email processing in which the MFP 10 reads an image formed on a document placed on the flat bed or the ADF to create image data and transmits the created image data to an external device by Email. The Scan-to-PC button 84 is for selection of a Scan-to-PC processing in which the MFP 10 reads an image formed on a document placed on the flat bed or the ADF to create image data and transmits the created image data to the PC 60. The Scan-to-Media button 86 is for selection of a Scan-to-Media processing in which the MFP 10 reads an image formed on a document placed on the flat bed or the ADF to create image data and stores the created image data into the USB memory 54.

Figure 3:
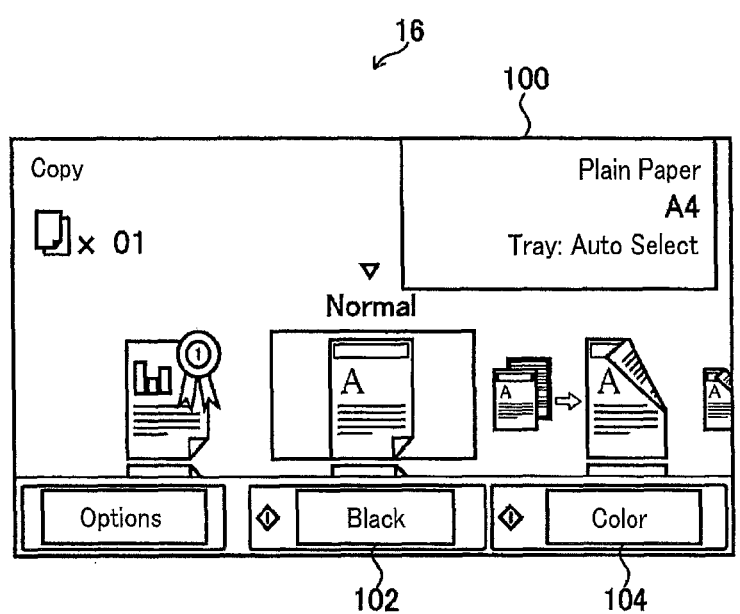
FIG. 3 is a view illustrating another processing execution screen.

When any of the buttons 72-86 displayed on the menu screen 70 is operated, the display 16 displays a processing execution screen for execution of a processing corresponding to the operated button. Specifically, when the copy button 72 is operated, the display 16 displays a processing execution screen 100 illustrated in FIG. 3 as one example of an acceptance image. The processing execution screen 100 contains a black-and-white copy button 102 and a color copy button 104. When the black-and-white copy button 102 is operated, a black-and-white copy is performed. When the color copy button 104 is operated, a color copy is performed. When the media print button 78 is operated, the display 16 displays a processing execution screen 110 illustrated in FIG. 4 as another example of the acceptance image. The processing execution screen 110 contains a determination button 112. When the determination button 112 is operated, the media print processing is executed. When the Scan-to-Media button 86 is operated, the display 16 displays a processing execution screen 120 illustrated in FIG. 5 as another example of the acceptance image. The processing execution screen 120 contains a start button 122. When the start button 122 is operated, the Scan-to-Media processing is executed.

The MFP 10 can thus execute a lot of kinds of processings. However, since there are many processings executable in the MFP 10, many selection buttons are displayed on the menu screen 70, making it difficult for the user to select a desired processing. To solve this problem, in this MFP 10, executable processing or processings are identified (determined) depending upon states of the respective objects used for execution of the various processings, and the display 16 displays a selection button or buttons for causing screen transition to one of the processing execution screens 100, 110, 120 or displays one of the processing execution screens 100, 110, 120 which corresponds to the identified processing, without any operation on the selection button.

In this MFP 10, specifically, the objects used for execution of the various processings include the manual tray, the internal tray, the flat bed, the ADF, and the USB interface 30, and the processings executable depending upon the states of the respective objects include the copy processing, the media print processing as one example of a print processing, and the Scan-to-Media processing as one example of a storing processing. A state of the manual tray is detected by the first sensor 24. That is, the first sensor 24 detects whether the printing sheet is present on the manual tray. It is noted that a state in which the printing sheet is present on the manual tray will be referred to as "ON state", and a state in which the printing sheet is absent on the manual tray will be referred to as "OFF state". A state of the internal tray is detected by the second sensor 25. That is, the second sensor 25 detects whether the printing sheet is present in the internal tray. It is noted that a state in which the printing sheet is present in the internal tray will be referred to as "ON state", and a state in which the printing sheet is absent in the internal tray will be referred to as "OFF state". A state of the flat bed is detected by the third sensor 26. That is, the third sensor 26 detects whether the document is present on the flat bed. It is noted that a state in which the document is present on the flat bed will be referred to as "ON state", and a state in which the document is absent on the flat bed will be referred to as "OFF state". A state of the ADF is detected by the fourth sensor 28. That is, the fourth sensor 28 detects whether the document is present on the ADF. It is noted that a state in which the document is present on the ADF will be referred to as "ON state", and a state in which the document is absent on the ADF will be referred to as "OFF state". A state of the USB interface 30 is detected by determining whether data transfer can be performed with the USB memory 54. That is, it is determined whether the USB memory 54 is connected to the USB interface 30. It is noted that a state in which the USB memory 54 is connected to the USB interface 30 will be referred to as "ON state", and a state in which the USB memory 54 is not connected to the USB interface 30 will be referred to as "OFF state".

The data storage area 52 stores map data indicating a relationship between the states of the respective objects and the processings executable depending upon the states of the respective objects. FIG. 6 conceptually illustrates this map data. In this map data, when the flat bed (FB) or the ADF is in the ON state, and at least one of the manual tray and the internal tray is in the ON state (see lines 6, 8, 10, 12, 14, and 16 in the map data), the copy processing is set as the processing executable depending upon the states of the respective objects. This is because the copy processing requires the document to be placed on the flat bed or the ADF and the printing sheet to be placed on at least one of the manual tray and the internal tray. Accordingly, when the flat bed or the ADF is in the ON state, and at least one of the manual tray and the internal tray is in the ON state, the display 16 displays the processing execution screen 100 illustrated in FIG. 3 for the copy processing.

However, in the case where the previous user places the document on the flat bed and forgets removing the document from the flat bed, for example, the object, i.e., the flat bed is in the ON state, which however is not intended by the user. That is, in the case where some length of time is elapsed from the time point at which the object is switched to the ON state, it is not clear whether the user desires execution of the processing corresponding to the object. Thus, in the case where the ADF is in the ON state, and at least one of the manual tray and the internal tray is in the ON state, the display 16 displays the processing execution screen 100 illustrated in FIG. 3 for the copy processing, when a length of time elapsed from the time point at which all of these objects are switched to the ON state, i.e., a length of time elapsed from switch of all of these objects from the OFF state to the ON state (hereinafter may be referred to as "elapsed time of the ON state") is less than or equal to a set length of time (in the present embodiment, one minute).

Figure 7:
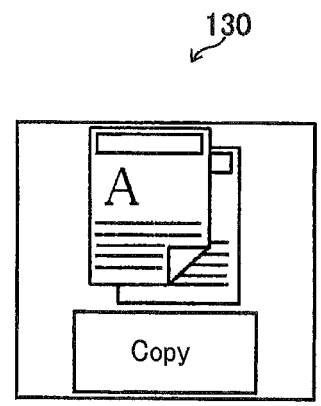
FIG. 7 is a view illustrating a copy-processing selection button.

When the ADF is in the ON state, and at least one of the manual tray and the internal tray is in the ON state, but the elapsed time of the ON state of any of the objects is greater than or equal to the set length of time, the display 16 displays a copy-processing selection button 130 (as another example of an icon) illustrated in FIG. 7 for promoting the user to check the objects. When the copy-processing selection button 130 is operated, the display 16 displays the processing execution screen 100 illustrated in FIG. 3 for the copy processing.

When the USB interface 30 is in the ON state, and at least one of the manual tray and the internal tray is in the ON state (see lines 7, 8, 11, 12, 15, and 16 in the map data), the media print processing is set as the processing executable depending upon the states of the respective objects. This is because the media print processing requires the USB memory 54 to be connected to the USB interface 30 and the printing sheet to be placed on at least one of the manual tray and the internal tray. Accordingly, when the USB interface 30 is in the ON state, and at least one of the manual tray and the internal tray is in the ON state, the display 16 displays the processing execution screen 110 illustrated in FIG. 4 for the media print processing.

Figure 4:
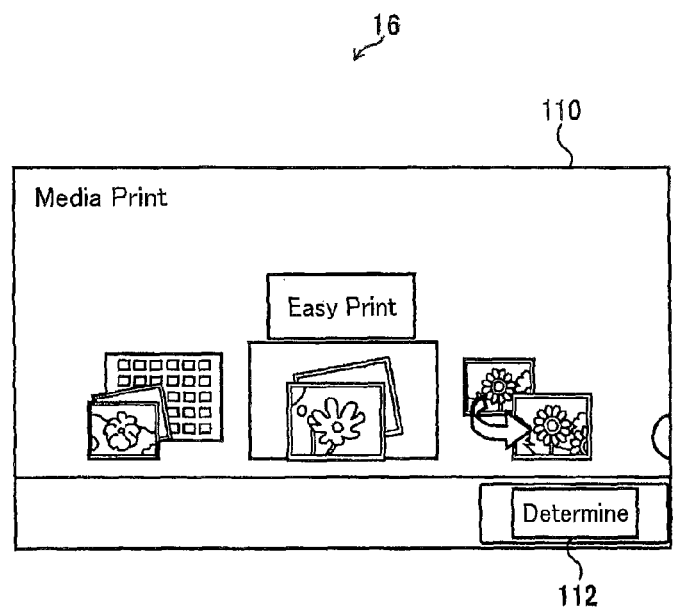
FIG. 4 is a view illustrating another processing execution screen.
Figure 8:
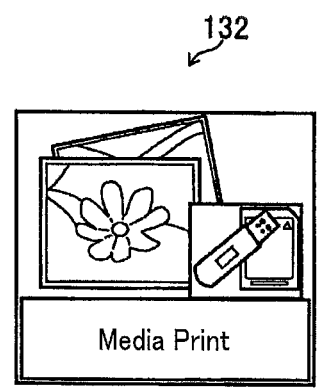
FIG. 8 is a view illustrating a media-print-processing selection button.

In this case, as in the copy processing, when the elapsed time of the ON state of each of all the objects corresponding to the media print processing is less than or equal to the set length of time, the display 16 displays the processing execution screen 110 illustrated in FIG. 4 for the media print processing. When the elapsed time of the ON state of any of the objects corresponding to the media print processing is greater than or equal to the set length of time, the display 16 displays a media-print-processing selection button 132 (as another example of the icon) illustrated in FIG. 8 for promoting the user to check the objects. When the media-print-processing selection button 132 is operated, the display 16 displays the processing execution screen 110 illustrated in FIG. 4 for the media print processing.

When the USB interface 30 is in the ON state, and the flat bed or the ADF is in the ON state (see lines 4, 8, 12, and 16 in the map data), the Scan-to-Media processing is set as the processing executable depending upon the states of the respective objects. This is because the Scan-to-Media processing requires the USB memory 54 to be connected to the USB interface 30 and the document to be placed on the flat bed or the ADF. Accordingly, when the USB interface 30 is in the ON state, and the flat bed or the ADF is in the ON state, the display 16 displays the processing execution screen 120 illustrated in FIG. 5 for the Scan-to-Media processing.

Figure 5:
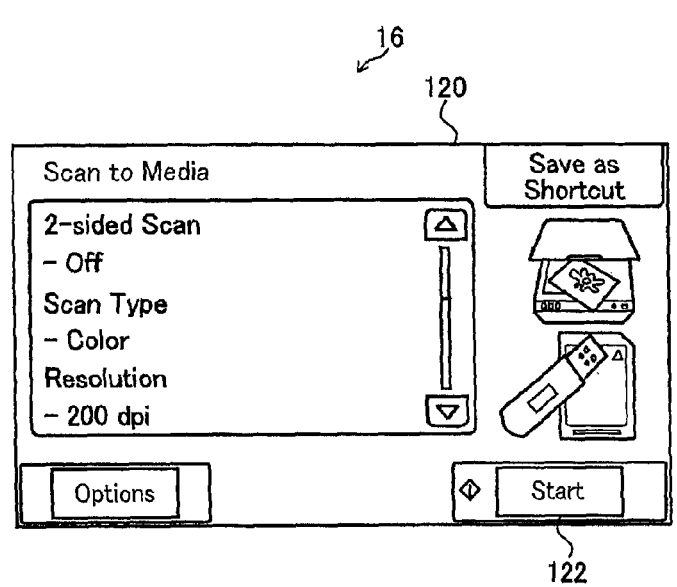
FIG. 5 is a view illustrating a processing execution screen.
Figure 9:
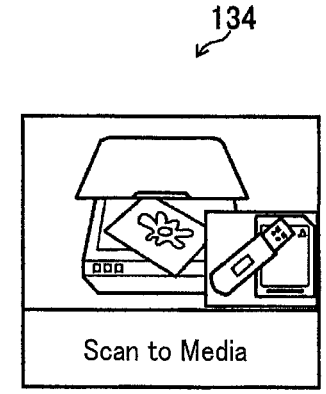
FIG. 9 is a view illustrating a Scan-to-Media-processing selection button.

In this case, as in the copy processing, when the elapsed time of the ON state of each of all the objects corresponding to the Scan-to-Media processing is less than or equal to the set length of time, the display 16 displays the processing execution screen 120 illustrated in FIG. 5 for the Scan-to-Media processing. When the elapsed time of the ON state of any of the objects corresponding to the Scan-to-Media processing is greater than or equal to the set length of time, the display 16 displays a Scan-to-Media-processing selection button 134 (as another example of the icon) illustrated in FIG. 9 for promoting the user to check the objects. When the Scan-to-Media-processing selection button 134 is operated, the display 16 displays the processing execution screen 120 illustrated in FIG. 5 for the Scan-to-Media processing.

In the MFP 10 as described above, the user only has to establish the predetermined state of the objects corresponding to the desired processing within the set length of time to cause the display 16 to display one of the processing execution screens 100, 110, 120 for execution of the processing to be executed. This configuration eliminates the need of user operation of the operation button to cause the display 16 to display a screen for accepting an instruction of execution of the processing desired by the user, i.e., one of the processing execution screens 100, 110, 120. When the object is in the predetermined state for a time longer than the set length of time, the selection button is displayed on the display 16 for displaying a screen for accepting an instruction of execution of the processing corresponding to the object, i.e., one of the processing execution screens 100, 110, 120. This processing can inquire of the user whether the user desires execution of the processing. Also, when the user desires execution of the processing, the user only needs to operate the displayed selection button to cause the display 16 to display a screen for accepting an instruction of execution of the processing.

As described above, the executable processing or processings are identified based on the states of the respective objects, and the display 16 displays the selection button corresponding to the identified processing. In the present embodiment, the MFP 10 further estimates the processing or processings executable depending upon the states of the respective objects and controls the display 16 to display a guide for explaining states of objects required for execution of the estimated processing or processings.

Figure 10:
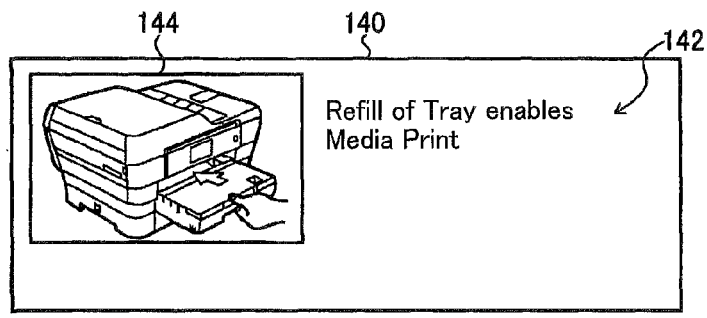
FIG. 10 is a view illustrating a first tray refill guide.

Specifically, in the case where the USB memory 54 is connected to the USB interface 30, for example, the CPU 12 estimates the processings executable using the USB memory 54 to be the media print processing and the Scan-to-Media processing. In the case where the user desires execution of the media print processing in this case and if no printing sheet is placed at least one of the manual tray and the internal tray, the user needs to place the printing sheet on the tray. Accordingly, in the case where the USB interface 30 is in the ON state, and both of the manual tray and the internal tray are in the OFF state, the display 16 displays a first tray refill guide 140 illustrated in FIG. 10 as one example of first notification information. The first tray refill guide 140 contains: a comment 142 (as one example of processing identification information) indicating that the media print processing becomes executable by a refill of the tray with the printing sheet; and an illustration 144 (as one example of second object identification information) that illustrates this indication. The illustration 144 in FIG. 10 illustrates a refill of the internal tray with the printing sheet. However, the illustration 144 changes at intervals of a predetermined length of time between the illustration of a refill of the internal tray with the printing sheet and an illustration of a refill of the manual tray with the printing sheet.

Also in this case, however, the ON state of the object may not be intended by the user as described above. That is, in the case where the previous user connects the USB memory 54 to the USB interface 30 and forgets removing the USB memory 54, the object, i.e., the USB interface 30 is in the ON state, which however is not intended by the user. Thus, displaying the first tray refill guide 140 on the display 16 is pointless. Accordingly, in the case where the USB interface 30 is in the ON state, and both of the manual tray and the internal tray are in the OFF state, the display 16 displays the first tray refill guide 140 on condition that the elapsed time of the ON state of the USB interface 30 is less than or equal to the set length of time.

Figure 11:
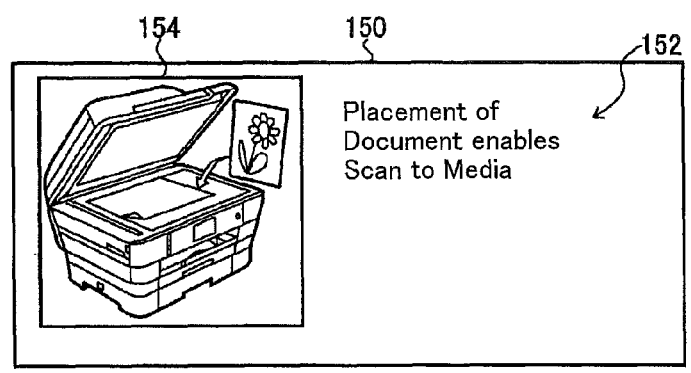
FIG. 11 is a view illustrating a first document placement guide.

In the case where the USB memory 54 is connected to the USB interface 30, and the user desires execution of the Scan-to-Media processing as the processing executable using the USB memory 54, and if no document is present on the flat bed or the ADF, the user needs to place the document on the flat bed or the ADF. Accordingly, in the case where the USB interface 30 is in the ON state, and both of the flat bed and the ADF are in the OFF state, the display 16 displays a first document placement guide 150 illustrated in FIG. 11 as another example of the first notification information. The first document placement guide 150 contains: a comment 152 (as another example of the processing identification information) indicating that the Scan-to-Media processing becomes executable by placement of the document; and an illustration 154 (as another example of the second object identification information) that illustrates this indication. The illustration 154 in FIG. 11 illustrates placement of the document on the flat bed. However, the illustration 154 changes at intervals of a predetermined length of time between the illustration of placement of the document on the flat bed and an illustration of placement of the document on the ADF.

Also in this case, however, the display 16 displays the first document placement guide 150 on condition that the elapsed time of the ON state of the USB interface 30 is less than or equal to the set length of time, because the user may forget removing the USB memory 54.

Figure 12:
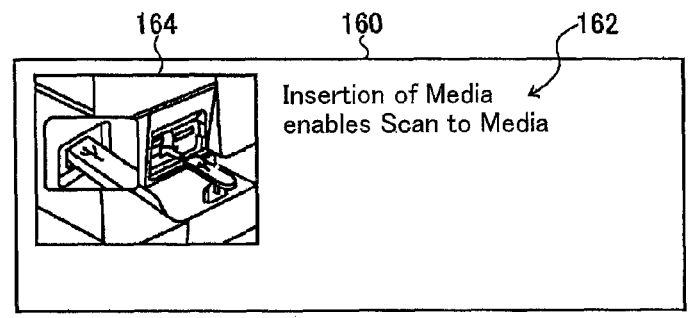
FIG. 12 is a view illustrating a first memory connection guide.

In the case where the document is present on the flat bed or the ADF, for example, the CPU 12 estimates the processings executable using the document to be the Scan-to-Media processing and the copy processing. In the case where the user desires execution of the Scan-to-Media processing in this case and if the USB memory 54 is not connected to the USB interface 30, the user needs to connect the USB memory 54 to the USB interface 30. Accordingly, in the case where the flat bed or the ADF is in the ON state, and the USB interface 30 is in the OFF state, the display 16 displays a first memory connection guide 160 illustrated in FIG. 12 as another example of the first notification information. The first memory connection guide 160 contains: a comment 162 (as another example of the processing identification information) indicating that the Scan-to-Media processing becomes executable by connection of the USB memory 54 to the USB interface 30; and an illustration 164 (as another example of the second object identification information) that illustrates this indication. Also in this case, the display 16 displays the first memory connection guide 160 on condition that the elapsed time of the ON state of the flat bed or the ADF is less than or equal to the set length of time, because the user may forget removing the document from the flat bed or the ADF.

In the case where the document is present on the flat bed or the ADF, and the user desires execution of the copy processing as the processing executable using the document, and if no printing sheet is placed at least one of the manual tray and the internal tray, the user needs to set the printing sheet on the tray. Accordingly, in the case where the flat bed or the ADF is in the ON state, and both of the manual tray and the internal tray are in the OFF state, the display 16 displays a second tray refill guide (as another example of the first notification information), not shown. The second tray refill guide is different from the first tray refill guide 140 only in the comment 142. A comment of the second tray refill guide indicates that the copy processing becomes executable by a refill of the tray with the printing sheet. Also in this case, the display 16 displays the second tray refill guide on condition that the elapsed time of the ON state of the flat bed or the ADF is less than or equal to the set length of time, because the user may forget removing the document from the flat bed or the ADF.

In the case where the printing sheet is present on at least one of the manual tray and the internal tray, for example, the CPU 12 estimates the processings executable using the printing sheet to be the media print processing and the copy processing. In the case where the user desires execution of the media print processing in this case and if the USB memory 54 is not connected to the USB interface 30, the user needs to connect the USB memory 54 to the USB interface 30. Accordingly, in the case where at least one of the manual tray and the internal tray is in the ON state, and the USB interface 30 is in the OFF state, the display 16 displays a second memory connection guide (as another example of the first notification information), not shown. The second memory connection guide is different from the first memory connection guide 160 only in the comment 162. A comment of the second memory connection guide indicates that the media print processing becomes executable by a connection of the USB memory 54. Also in this case, the display 16 displays the second memory connection guide on condition that the elapsed time of the ON state of the manual tray or the internal tray is less than or equal to the set length of time, because the user may forget removing the printing sheet from the manual tray or the internal tray.

In the case where the printing sheet is present on at least one of the manual tray and the internal tray, and the user desires execution of the copy processing as the processing executable using the printing sheet, and if no document is present on the flat bed or the ADF, the user needs to place the document on the flat bed or the ADF. Accordingly, in the case where at least one of the manual tray and the internal tray is in the ON state, and both of the flat bed and the ADF are in the OFF state, the display 16 displays a second document placement guide (as another example of the first notification information), not shown. The second document placement guide is different from the first document placement guide 150 only in the comment 152. A comment of the second document placement guide indicates that the copy processing becomes executable by placement of the document. Also in this case, the display 16 displays the second document placement guide on condition that the elapsed time of the ON state of the manual tray or the internal tray is less than or equal to the set length of time, because the user may forget removing the printing sheet from the manual tray or the internal tray.

In the map data illustrated in FIG. 6, the states of the respective objects are associated with information identifying a guide to be displayed on the display 16 based on the states of the respective objects. Specifically, in the case where the USB interface 30 is in the ON state, and the other objects are in the OFF state (see line 3 in the map data), for example, information indicating requirement of placement of the printing sheet on at least one of the manual tray and the internal tray for the media print processing ("Requiring turning Internal or Manual Tray to ON") and information indicating requirement of placement of the document on the flat bed or the ADF for the Scan-to-Media processing ("Requiring turning FB or ADF to ON") are associated with each other. The information "Requiring turning Internal or Manual Tray to ON" for the media print processing indicates requirement of placement of the printing sheet for execution of the media print processing. This information identifies the first tray refill guide 140. The information "Requiring turning FB or ADF to ON" for the Scan-to-Media processing indicates requirement of placement of the printing sheet for execution of the Scan-to-Media processing. This information identifies the first document placement guide 150. Accordingly, in the case where the USB memory 54 is connected to the USB interface 30, and no printing sheet and no document are placed, the CPU 12 identifies the first tray refill guide 140 and the first document placement guide 150 by referring to the map data. The CPU 12 then displays the first tray refill guide 140 and the first document placement guide 150 on the display 16.

In the case where at least one of the manual tray and the internal tray is in the ON state, and the other objects are in the OFF state (see lines 5, 9, and 13 in the map data), for example, information indicating requirement of placement of the document on the flat bed or the ADF for the copy processing ("Requiring turning FB or ADF to ON") and information indicating requirement of connection of the USB memory 54 to the USB interface 30 for the media print processing ("Requiring turning USB I/F to ON") are associated with each other. The information "Requiring turning FB or ADF to ON" for the copy processing indicates requirement of placement of the document for execution of the copy processing. This information identifies the second document placement guide. The information "Requiring turning USB I/F to ON" for the media print processing indicates requirement of connection of the USB memory 54 to the USB interface for execution of the media print processing. This information identifies the second memory connection guide. Accordingly, in the case where the printing sheet is present on at least one of the manual tray and the internal tray, and the document is absent, and the USB memory 54 is not connected, the CPU 12 identifies the second document placement guide and the second memory connection guide by referring to the map data. The CPU 12 then displays the second document placement guide and the second memory connection guide on the display 16.

The CPU 12 estimates the processing or processings executable depending upon the states of the respective objects and controls the display 16 to display the guide corresponding to the estimated processing as described above. These processings can promote the user to perform operations required for execution of the estimated processing or processings. When the user performs operations according to the guide, the object required for execution of the estimated processing is switched to the ON state, so that the estimated processing is set as the executable processing in the map data.

Specifically, in the case where at least one of the manual tray and the internal tray is in the ON state, and the USB interface 30 is in the OFF state, for example, the CPU 12 estimates the processing executable depending upon the states of the respective objects to be the media print processing and displays the second memory connection guide on the display 16. When the user connects the USB memory 54 to the USB interface 30 according to the second memory connection guide, the USB interface 30 is switched to the ON state. That is, the CPU 12 identifies the media print processing as the executable processing in the case where the USB interface 30 is in the ON state, and at least one of the manual tray and the internal tray is in the ON state (see lines 7, 8, 11, 12, 15, and 16 in the map data in FIG. 6). As a result, the processing execution screen 110 is displayed on the display 16.

That is, when the user performs an operation for the object according to the guide, execution of particular processings is prepared. Also, when the user performs a predetermined operation for the object, the object is switched to the ON state, and the executable processing is identified in the map data. As a result, the user only needs to perform the predetermined operation for the object according to the guide to display one of the processing execution screens 100, 110, 120 on the display 16 without operation on the operation button.

Some objects cannot be directly viewed by the user, making it impossible for the user to perform a visual check of a state of the object. This case may lead to execution of processings not intended by the user. Specifically, the user may place the document on the flat bed and forget removing the document. In such a case, if a cover of the flat bed is closed, a user who uses the MFP 10 next cannot realize that the document is present on the flat bed. That is, the flat bed is in the ON state against a will of the user. Thus, the ON state of the flat bed causes the display 16 to display the selection button. If the user operates this selection button by mistake, processings unintended by the user are executed unfortunately.

To solve this problem, in the case where the flat bed is in the ON state, and this ON state causes the selection button to be displayed on the display 16, the CPU 12 of this MFP 10 determines whether the ON state of the flat bed has been kept for a relatively long time. That is, the CPU 12 determines whether the flat bed has been kept in the ON state for a set length of time (in the present embodiment, one minute) because the previous user forgets removing the document, for example. In the case where the flat bed is kept in the ON state for one minute, that is, in the case where the elapsed time of the ON state of the flat bed is greater than or equal to one minute, the display 16 displays not only the selection button but also a guide for the document present on the flat bed.

Figure 13:
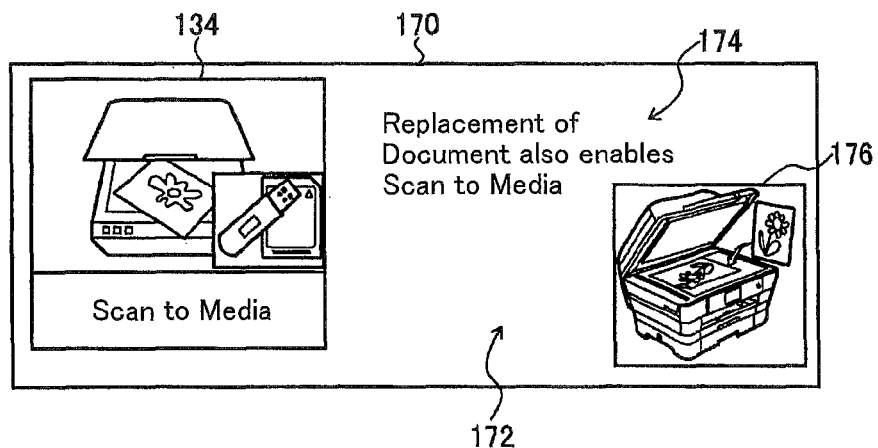
FIG. 13 is a view illustrating a first screen.

Specifically, in the case where the document is present on the flat bed, and the USB memory 54 is connected to the USB interface 30, for example, the Scan-to-Media processing is identified as the processing executable by the placement of the document and the connection of the USB memory 54. In such a case, the CPU 12 determines whether the elapsed time of the ON state of the flat bed is greater than or equal to one minute. When the elapsed time of the ON state of the flat bed is greater than or equal to one minute, the display 16 displays a first screen 170 illustrated in FIG. 13. This first screen 170 contains the Scan-to-Media-processing selection button 134 and a document replacement guide 172 as one example of second notification information. The document replacement guide 172 contains: a comment 174 that promotes the user to replace the document present on the flat bed with new one; and an illustration 176 that illustrates this indication. This document replacement guide 172 allows the user to recognize that the document is present on the flat bed and that the Scan-to-Media processing can be executed by replacing the document, so that the user can instruct appropriate processings.

The selection button and the guide may be displayed on the display 16 at the same time depending upon the states of the objects. Specifically, in the case where the document is present on the flat bed or the ADF, and the printing sheet is present on at least one of the manual tray and the internal tray, for example, the copy processing is identified as the processing executable using the document and the printing sheet. Thus, the display 16 displays the copy-processing selection button 130. Incidentally, since the document is present on the flat bed or the ADF, the CPU 12 estimates the processing executable using the document to be the Scan-to-Media processing. Thus, the display 16 displays the first memory connection guide 160. That is, in the case where the document is present on the flat bed or the ADF, and the printing sheet is present on at least one of the manual tray and the internal tray, as illustrated in FIG. 14, the copy-processing selection button 130 and the first memory connection guide 160 are displayed on the display 16 at the same time.

However, in the case where the selection button and the guide are displayed on the display 16 at the same time, the selection button and the guide are displayed on the display 16 in order of priority. Specifically, in the case where the previous user connects the USB memory 54 to the USB interface 30 and forgets removing the USB memory 54, for example, the object is in the ON state, causing the selection button to be displayed. In such a case, there is a high possibility that the display of the selection button is not intended by the user currently operating the MFP 10. That is, in the case where the elapsed time of the ON state of the object used for identifying the processing corresponding to the selection button is relatively long, there is low possibility that the user uses the selection button. Thus, the elapsed time of the ON state of the object used for identifying the processing corresponding to the selection button is greater than or equal to the set length of time (one minute), a low priority is given to the selection button.

When the user changes the state of the object from the OFF state to the ON state to cause execution of particular processings, the elapsed time of the ON state of the object is relatively short in most cases. That is, in the case where the guide is identified by the object with the short elapsed time of the ON state, there is a high possibility that the user uses this guide. Accordingly, in the case where the elapsed time of the ON state of the object used for identifying the guide is less than or equal to the set length of time (one minute), a high priority is given to the guide.

Figure 14:
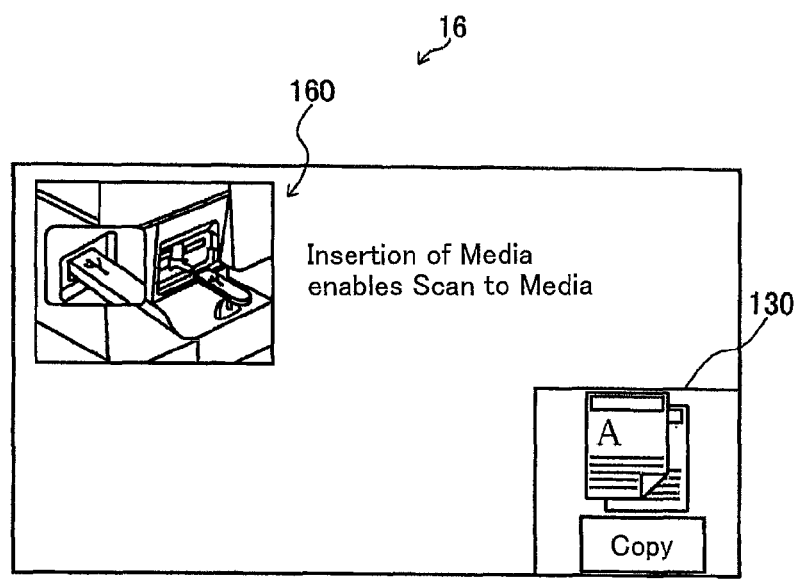
FIG. 14 is a view illustrating the copy-processing selection button and the first memory connection guide.

Specifically, as illustrated in FIG. 14, in the case where the copy-processing selection button 130 and the first memory connection guide 160 are displayed on the display 16 at the same time, for example, the flat bed or the ADF is in the ON state, and at least one of the manual tray and the internal tray is also in the ON state. In this case, when the elapsed time of the ON state of the flat bed or the ADF is less than or equal to one minute, and the elapsed time of the ON state of the at least one of the manual tray and the internal tray is greater than or equal to one minute, a low priority is given to the copy-processing selection button 130, and a high priority is given to the first memory connection guide 160. Thus, the first memory connection guide 160 is displayed in large size, and the copy-processing selection button 130 is displayed in a size smaller than that of the first memory connection guide 160. As described above, a high display priority is given to the guide that is to be used by the user with high possibility, resulting in improved viewability.

Even in the case where the elapsed time of the ON state of the object used for identifying the processing corresponding to the selection button is greater than or equal to one minute, when the object is the flat bed, a middle priority is given to the selection button. Specifically, as described above, in the case where the ON state of the flat bed causes the selection button to be displayed, when the elapsed time of the ON state of the flat bed is greater than or equal to one minute, for example, the display 16 displays the first screen 170 containing the Scan-to-Media-processing selection button 134 and the document replacement guide 172. The first screen 170 notifies the user that the document is present on the flat bed, and this first screen 170 is important in some degree. Thus, a middle priority is given to this first screen 170.

Specifically, in the case where the flat bed is in the ON state, and the USB interface 30 is also in the ON state, the CPU 12 determines that the Scan-to-Media processing is executable by the document of the flat bed and the USB memory 54 and estimates the media print processing to be executable by the USB memory 54. Thus, the Scan-to-Media-processing selection button 134 and the first tray refill guide 140 are displayed on the display 16 at the same time in most cases. However, in the case where the elapsed time of the ON state of the flat bed is greater than or equal to one minute, the display 12 displays, instead of the Scan-to-Media-processing selection button 134, the first screen 170 containing the Scan-to-Media-processing selection button 134 and the illustration 176. In this case, a middle priority is given to the first screen 170.

Figure 15:
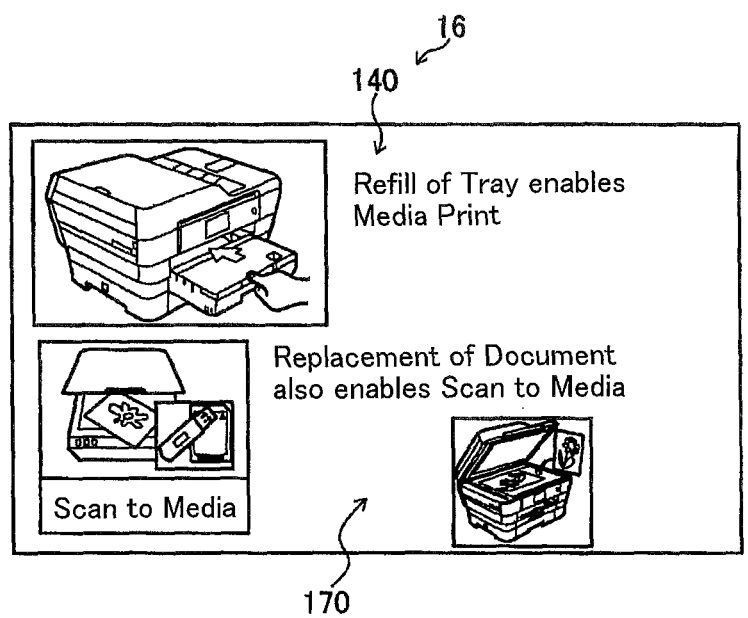
FIG. 15 is a view illustrating the first tray refill guide and the first screen.

In the case where the elapsed time of the ON state of the USB interface 30 is less than or equal to one minute, a high priority is given to the first tray refill guide 140. Thus, as illustrated in FIG. 15, the first tray refill guide 140 is displayed in large size, and the first screen 170 is displayed in a size smaller than that of the first tray refill guide 140. However, since the middle priority is given to the first screen 170, this first screen 170 is displayed in a size larger than that of the selection button to which the low priority is given. As a result, the user can appropriately check information displayed on the first screen 170.

Control Program

The CPU 12 executes the control program 50 to execute processings for displaying one of the processing execution screens 100, 110, 120 on the display 16 depending upon the states of the respective objects. There will be next explained, with reference to FIGS. 16-20, a flow to be executed when the control program 50 is executed by the CPU 12.

Figure 16:
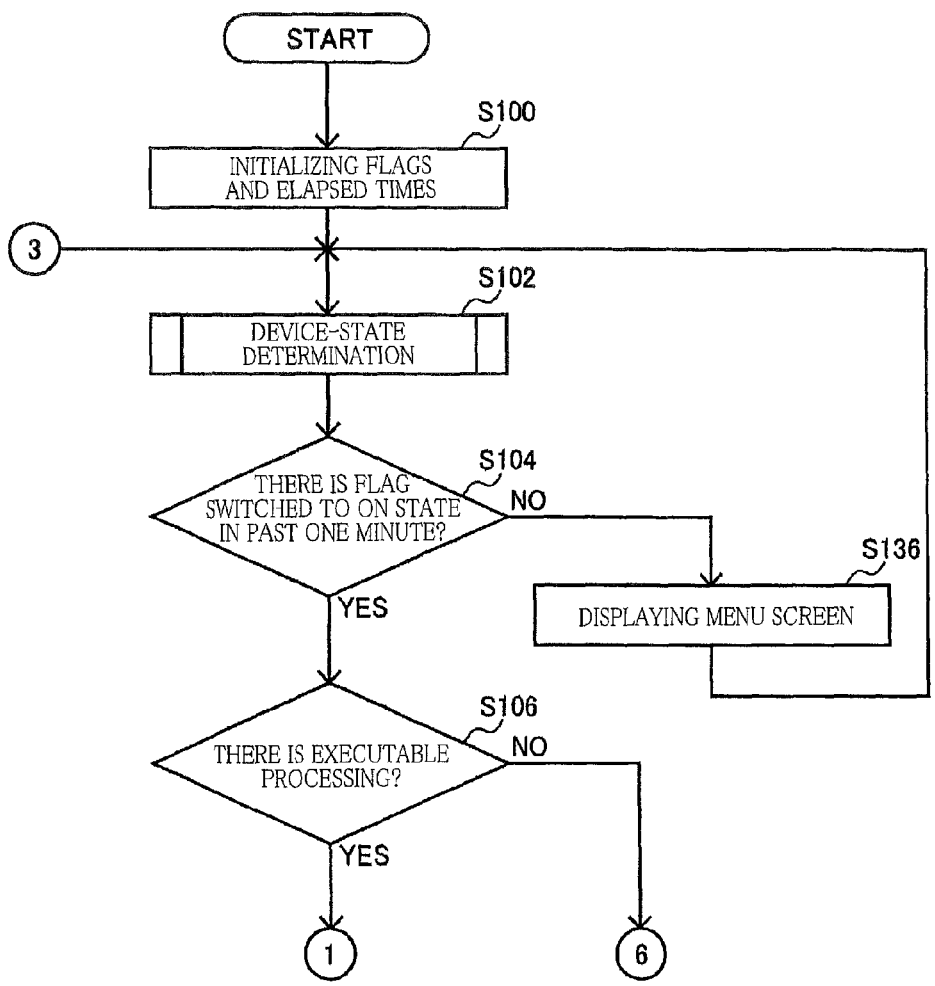
FIG. 16 is a flow chart illustrating operation of a multi-function peripheral (MFP)
Figure 17:
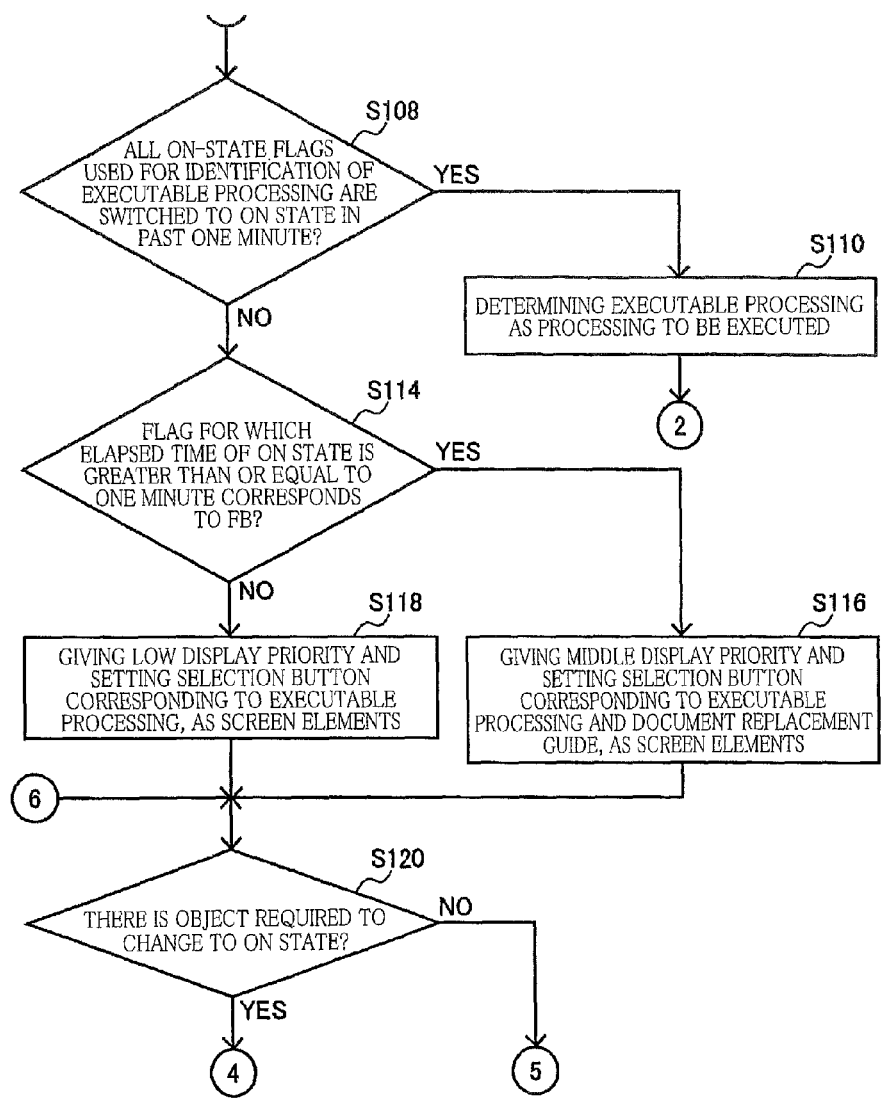
FIG. 17 is a flow chart illustrating operation of the MFP.
Figure 18:
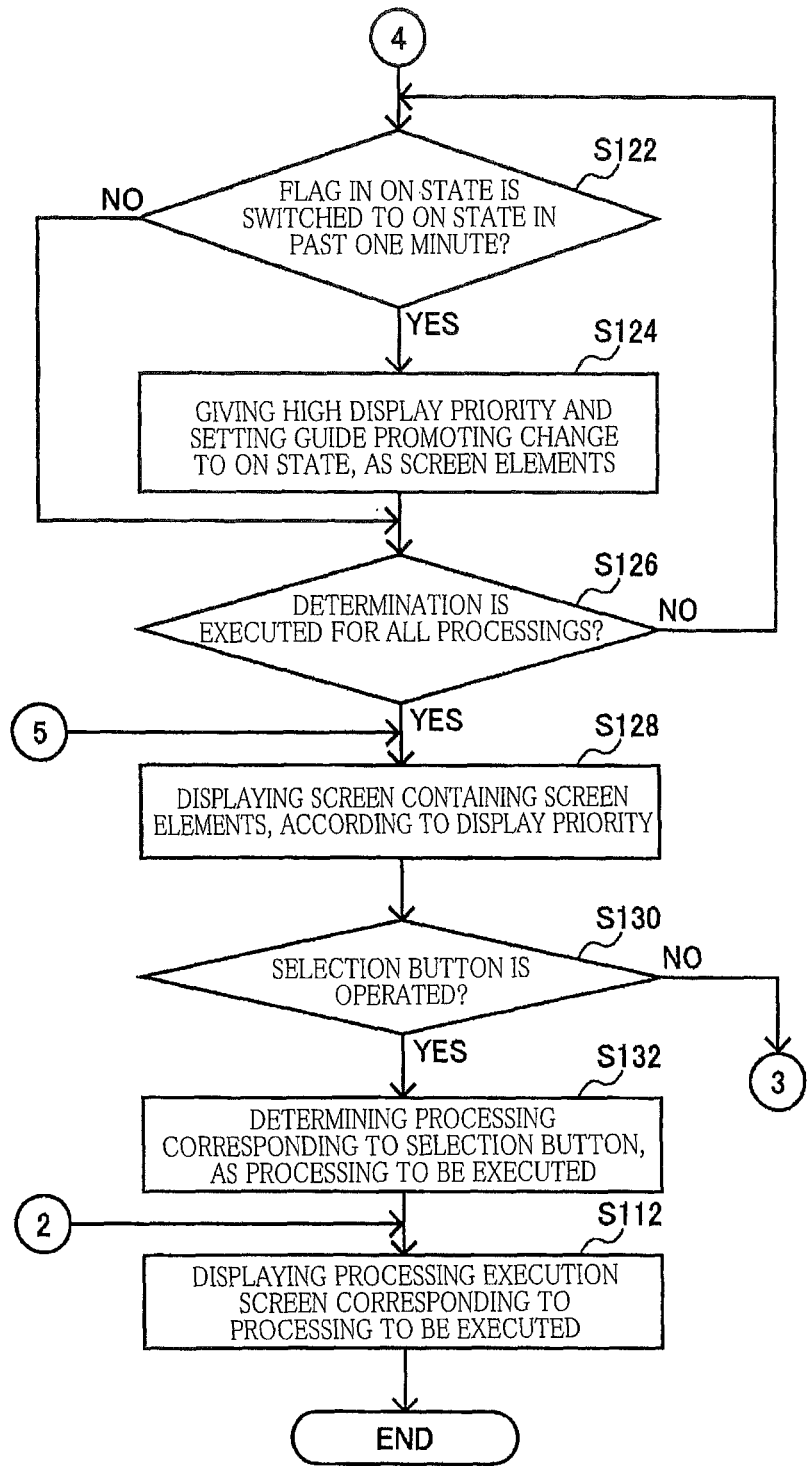
FIG. 18 is a flow chart illustrating operation of the MFP.
Figure 19:
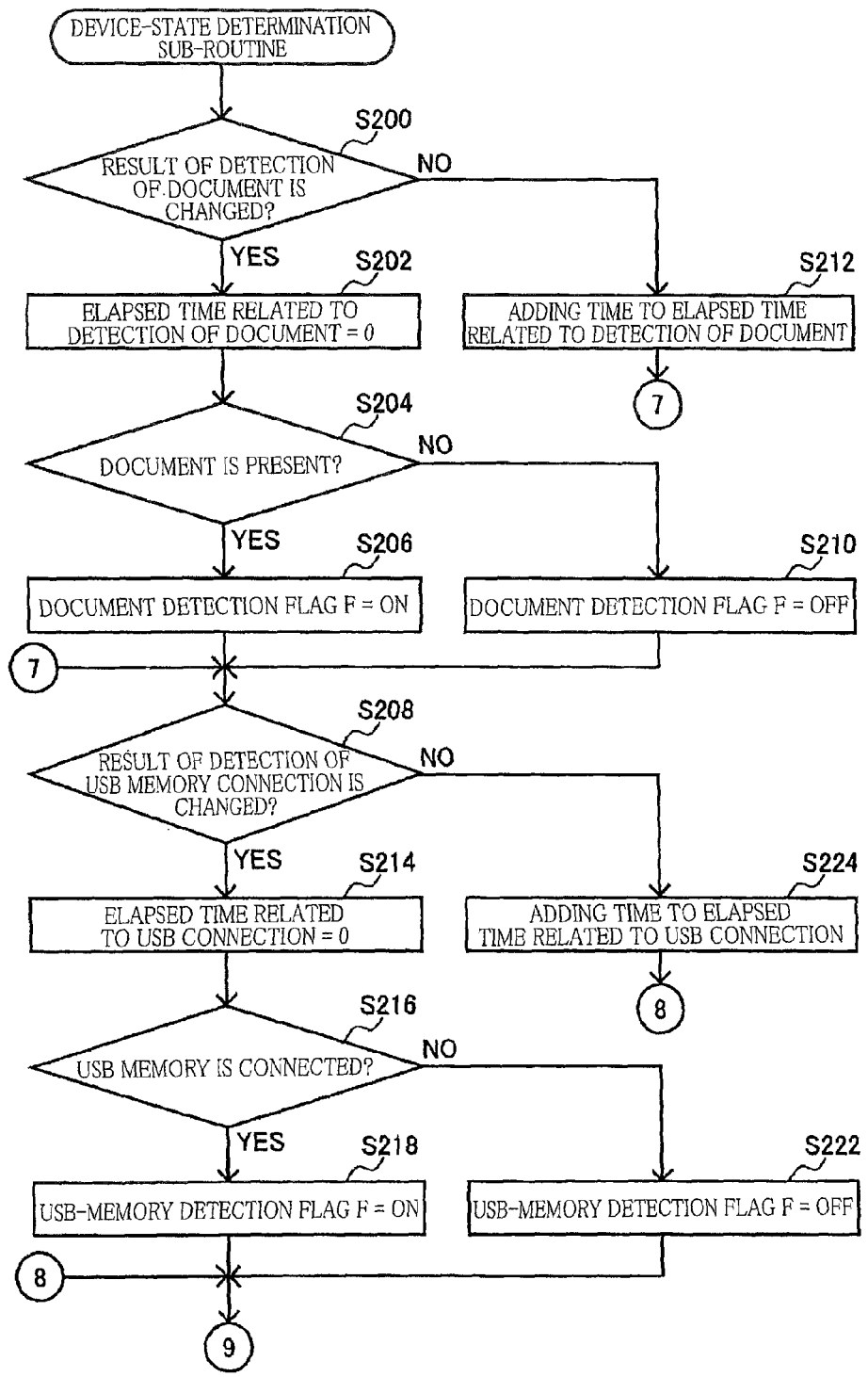
FIG. 19 is a flow chart illustrating operation of the MFP.
Figure 20:
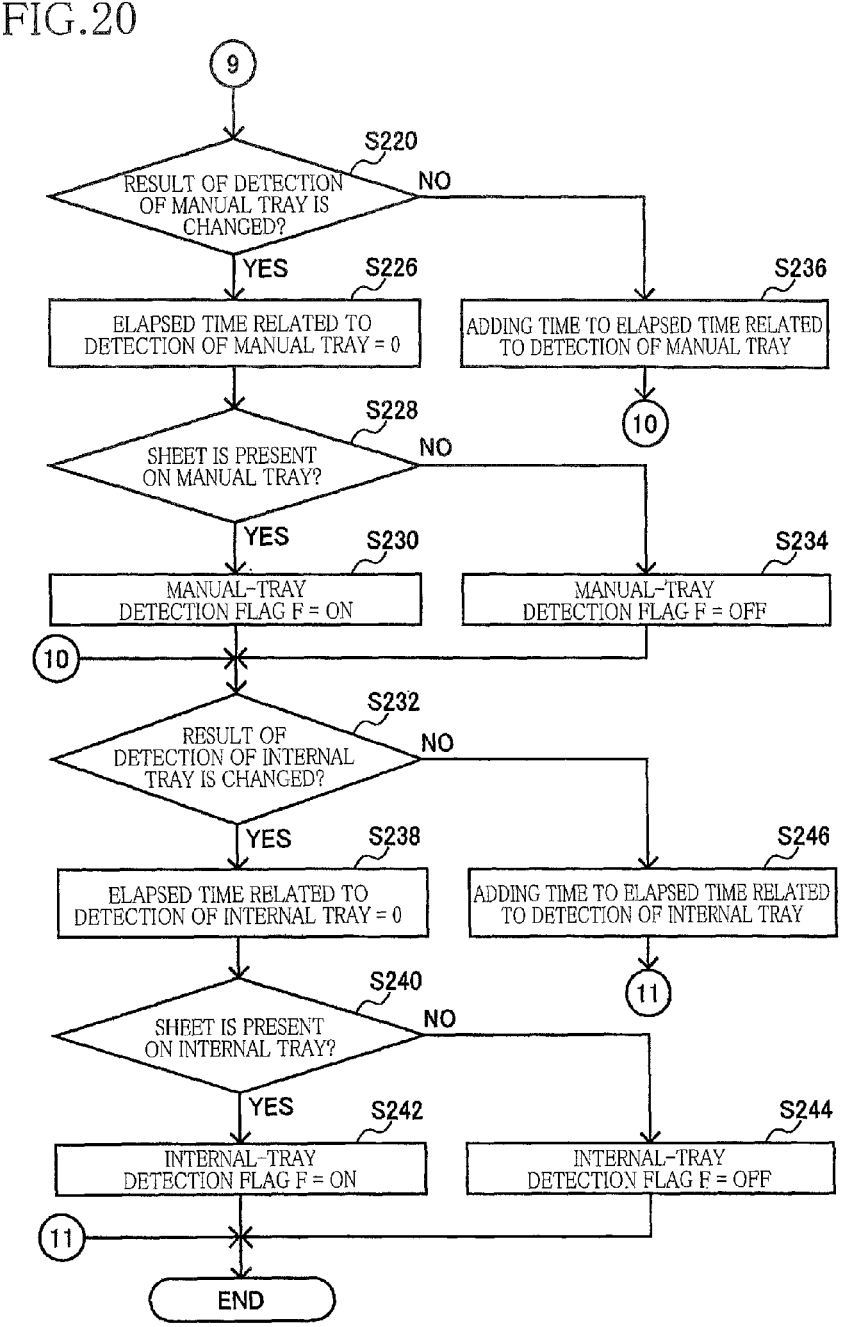
FIG. 20 is a flow chart illustrating operation of the MFP.

When the control program 50 is executed by the CPU 12, as illustrated in FIG. 16, this flow begins with S100 at which the CPU 12 initializes flags and elapsed times which will be described below in detail. The CPU 12 at S102 executes a device-state determination sub-routine. As illustrated in FIG. 19, this device-state determination sub-routine begins with S200 at which the CPU 12 determines whether a result of detection of the document is changed. That is, the CPU 12 determines whether a result of detection of any of (i) the third sensor 26 for detecting the presence or absence of the document on the flat bed and (ii) the fourth sensor 28 for detecting the presence or absence of the document on the ADF is changed.

When the result of detection of any of the third sensor 26 and the fourth sensor 28 is changed (S200: YES), the CPU 12 at S202 sets an elapsed time related to the detection of the document to zero. That is, when the third sensor 26 or the fourth sensor 28 detects a change of the flat bed or the ADF from the OFF state to the ON state, the CPU 12 sets the elapsed time of the ON state of the flat bed or the ADF to zero. When the third sensor 26 or the fourth sensor 28 detects a change of the flat bed or the ADF from the ON state to the OFF state, the CPU 12 sets the elapsed time of the OFF state of the flat bed or the ADF to zero.

The CPU 12 at S204 determines whether the third sensor 26 or the fourth sensor 28 indicates that the document is present on the flat bed or the ADF. When the document is present on the flat bed or the ADF (S204: YES), the CPU 12 at S206 sets a document detection flag F to ON, and this flow goes to S208.

It is noted that the document detection flag F indicates whether or not the document is present on the flat bed or the ADF. When the document detection flag F is ON, the document is present on the flat bed or th has been e ADF. When the document detection flag F is OFF, the document is absent on the flat bed or the ADF. Thus, when the document is absent on the flat bed or the ADF (S204: NO), the CPU 12 at S210 sets the document detection flag F to OFF, and this flow goes to S208.

When the CPU 12 at S200 determines that the result of detection of any of the third sensor 26 and the fourth sensor 28 is not changed (S200: NO), the CPU 12 at S212 adds a particular length of time to the elapsed time related to the detection of the document. That is, the CPU 12 adds the particular length of time to the elapsed time of the ON state of the flat bed or the ADF or the elapsed time of the OFF state of the flat bed or the ADF. This flow then goes to S208. It is noted that the document detection flag F and the elapsed time are stored for each of the flat bed and the ADF.

The CPU 12 at S208 determines whether a result of detection of the connection of the USB memory 54 to the USB interface 30 is changed. When the result of detection of the connection of the USB memory 54 to the USB interface 30 is changed (S208: YES), the CPU 12 at S214 sets an elapsed time related to the connection of the USB memory 54 to the USB interface 30 to zero. That is, when a change of the USB interface 30 from the OFF state to the ON state is detected, the CPU 12 sets the elapsed time of the ON state of the USB interface 30 to zero. When a change of the USB interface 30 from the ON state to the OFF state is detected, the CPU 12 sets the elapsed time of the OFF state of the USB interface 30 to zero.

The CPU 12 at S216 determines whether the USB memory 54 is connected to the USB interface 30. When the USB memory 54 is connected to the USB interface 30 (S216: YES), the CPU 12 at S218 sets a USB-memory detection flag F to ON, and this flow goes to S220.

It is noted that the USB-memory detection flag F indicates whether the USB memory 54 is connected to the USB interface 30. When the USB-memory detection flag F is ON, the USB memory 54 is connected to the USB interface 30. When the USB-memory detection flag F is OFF, the USB memory 54 is not connected to the USB interface 30. Thus, when the USB memory 54 is not connected to the USB interface 30 (S216: NO), the CPU 12 at S222 sets the USB-memory detection flag F to OFF, and this flow goes to S220.

When the CPU 12 at S208 determines that the result of detection of the connection of the USB memory 54 to the USB interface 30 is not changed (S208: NO), the CPU 12 at S224 adds the particular length of time to the elapsed time related to the connection of the USB memory 54 to the USB interface 30. That is, the CPU 12 adds the particular length of time to the elapsed time of the ON state of the USB interface 30 or the elapsed time of the OFF state of the USB interface 30. This flow then goes to S220.

The CPU 12 at S220 determines whether a result of detection of the manual tray is changed. That is, the CPU 12 determines whether a result of detection of the first sensor 24 for detecting the presence or absence of the printing sheet on the manual tray is changed. When the result of detection of the first sensor 24 is changed (S220: YES), the CPU 12 at S226 sets the elapsed time related to the detection of the manual tray to zero. That is, when the first sensor 24 detects a change of the manual tray from the OFF state to the ON state, the CPU 12 sets the elapsed time of the ON state of the manual tray to zero. When the first sensor 24 detects a change of the manual tray from the ON state to the OFF state, the CPU 12 sets the elapsed time of the OFF state of the manual tray to zero.

The CPU 12 at S228 determines whether the first sensor 24 indicates that the printing sheet is present on the manual tray. When the printing sheet is present on the manual tray (S228: YES), the CPU S230 sets a manual-tray detection flag F to ON, and this flow goes to S232.

It is noted that the manual-tray detection flag F indicates whether the printing sheet is present on the manual tray. When the manual-tray detection flag F is ON, the printing sheet is present on the manual tray. When the manual-tray detection flag F is OFF, the printing sheet is absent on the manual tray. Thus, when the printing sheet is absent on the manual tray (S228: NO), the CPU 12 at S234 sets the manual-tray detection flag F to OFF, and this flow goes to S232.

When the CPU 12 at S220 determines that the result of detection of the first sensor 24 is not changed (S220: NO), the CPU 12 at S236 adds the particular length of time to the elapsed time related to the detection of the manual tray. That is, the CPU 12 adds the particular length of time to the elapsed time of the ON state of the manual tray or the elapsed time of the OFF state of the manual tray. This flow then goes to S232.

The CPU 12 at S232 determines whether a result of detection of the internal tray is changed. That is, the CPU 12 determines whether a result of detection of the second sensor 25 for detecting the presence or absence of the printing sheet on the internal tray is changed. When the result of detection of the second sensor 25 is changed (S232: YES), the CPU 12 at S238 sets the elapsed time related to the detection of the internal tray to zero. That is, when the second sensor 25 detects a change of the internal tray from the OFF state to the ON state, the CPU 12 sets the elapsed time of the ON state of the internal tray to zero. When the second sensor 25 detects a change of the internal tray from the ON state to the OFF state, the CPU 12 sets the elapsed time of the OFF state of the internal tray to zero.

The CPU 12 at S240 whether the second sensor 25 indicates that the printing sheet is present on the internal tray. When the printing sheet is present on the internal tray (S240: YES), the CPU 12 at S242 sets an internal-tray detection flag F to ON, and the device-state determination sub-routine ends.

It is noted that the internal-tray detection flag F indicates whether the printing sheet is present on the internal tray. When the internal-tray detection flag F is ON, the printing sheet is present on the internal tray. When the internal-tray detection flag F is OFF, the printing sheet is absent on the internal tray. Thus, when the printing sheet is absent on the internal tray (S240: NO), the CPU 12 at S244 sets the internal-tray detection flag F to OFF, and this device-state determination sub-routine ends.

When the CPU 12 at S232 determines that the result of detection of the second sensor 25 is not changed (S232: NO), the CPU 12 at S246 adds the particular length of time to the elapsed time related to the detection of the internal tray. That is, the CPU 12 adds the particular length of time to the elapsed time of the ON state of the internal tray or the elapsed time of the OFF state of the internal tray. Upon completion of the processing at S246, the device-state determination sub-routine ends.

Upon termination of the device-state determination sub-routine, this flow goes to S104 in the main routine in FIG. 16. The CPU 12 at S104 determines whether there is a flag switched to the ON state in the past one minute. When there is a flag switched to the ON state in the past one minute (S104: YES), the CPU 12 at S106 refers to the map data and determines whether there is a processing executable depending upon flag or flags in the ON state.

When there is a processing executable depending upon flag or flags in the ON state (S106: YES), the CPU 12 at S108 determines whether all the ON-state flag or flags used for identification of the executable processing are switched to the ON state in the past one minute. When all the ON-state flag or flags used for identification of the executable processing are switched to the ON state in the past one minute (S108: YES), the CPU 12 at S110 determines the executable processing as a processing to be executed. The CPU 12 at S112 controls the display 16 to display a processing execution screen corresponding to the processing to be executed, and this flow ends. It is noted that when the CPU 12 at S108 determines that all the ON-state flag or flags used for identification of the executable processing are switched to the ON state in the past one minute, the CPU 12 at S112 controls the display 16 to display the processing execution screen corresponding to the processing to be executed, without waiting for an operation on the selection button at S130 (S130: NO). This processing improves operability of the MFP 10 for the user.

When all the ON-state flag or flags used for identification of the executable processing are not switched to the ON state in the past one minute (S108: NO), the CPU 12 at S114 determines whether the flag for which the elapsed time of the ON state is greater than or equal to one minute is a document detection flag corresponding to the flat bed. When the flag for which the elapsed time of the ON state is greater than or equal to one minute is the document detection flag corresponding to the flat bed (S114: YES), the CPU 12 at S116 gives a middle display priority and sets a selection button corresponding to the executable processing and the document replacement guide 172, as screen elements which are components of the processing execution screen corresponding to the processing to be executed. Upon completion of the processing at S116, this flow goes to S120.

When the flag for which the elapsed time of the ON state is greater than or equal to one minute is not the document detection flag corresponding to the flat bed (S114: NO), the CPU 12 at S118 gives a low display priority and sets a selection button corresponding to the executable processing, as the screen elements, and this flow goes to S120. The CPU 12 at S120 determines whether there is an object which is required to change to the ON state. That is, the CPU 12 refers to the map data and determines whether there is a processing corresponding to "Requiring turning Object to ON".

When there is an object which is required to change to the ON state (S120: YES), the CPU 12 at S122 determines whether the flag currently in the ON state is switched to the ON state in the past one minute. When the flag currently in the ON state is switched to the ON state in the past one minute (S122: YES), the CPU 12 at S124 gives a high display priority and sets the guide promoting change to the ON state, as the screen elements, and this flow goes to S126. When the flag currently in the ON state is not switched to the ON state in the past one minute (S122: NO), this flow goes to S126 by skipping S124.

The CPU 12 at S126 determines whether the determination at S122 is executed for all the processings. When the determination at S122 is not executed for all the processings (S126: NO), this flow returns to S122. When the determination at S122 is executed for all the processings (S126: YES), the CPU 12 at S128 controls the display 16 to display a screen containing the screen elements, according to the display priority.

The CPU 12 at S130 determines whether a selection button is operated on the screen displayed at S128 on the display 16. When the selection button is not operated on the screen displayed at S128 on the display 16 (S130: NO), this flow returns to S102. When the selection button is operated (S130: YES), the CPU 12 at S132 determines a processing corresponding to the operated selection button, as the processing to be executed. The CPU 12 at S112 controls the display 16 to display the processing execution screen corresponding to the processing to be executed, and this flow ends.

When the CPU 12 determines that there is no object which is required to change to the ON state (S120: NO), this flow goes to S128. When the CPU 12 at S106 determines that there is no processing executable depending upon flag or flags in the ON state (S106: NO), this flow goes to S120. When the CPU 12 at S104 determines that there is no flag switched to the ON state in the past one minute (S104: NO), the CPU 12 at S136 displays the menu screen 70 on the display 16, and this flow returns to S102.

While the embodiment has been described above, it is to be understood that the disclosure is not limited to the details of the illustrated embodiment, but may be embodied with various changes and modifications, which may occur to those skilled in the art, without departing from the spirit and scope of the disclosure. Specifically, the MFP 10 is capable of executing the copy processing, the media print processing, and the Scan-to-Media processing in the above-described embodiment, but may additionally execute various processings such as a Scan-to-PC processing, a Scan-to-Email processing, a Scan-to-FTP processing, and a facsimile processing. In this case, the network interface 32 and the telephone-network connecting device 36 may serve as the objects, for example.

In the above-described embodiment, the display 16 at S128 displays the first tray refill guide 140 containing the comment 142 and the illustration 144, for example. The first tray refill guide 140 may only contain the illustration 144 without containing the comment 142. Since the first tray refill guide 140 contains the illustration 144 promoting the user to replenish the printing sheet, when the sheet is replenished by the user according to the illustration 144, the display 16 can display the processing execution screen 100 or 110 at S112, resulting in improved operability.

In the above-described embodiment, the processings illustrated in FIGS. 16-20 are executed by the CPU 12. These processings need not be executed by the CPU 12 and may be executed by an ASIC or another or other similar logical integrated circuits and may be executed by cooperation of the CPU, the ASIC, and the logical integrated circuit, for example.

What is claimed is:

1. An image processing apparatus, comprising:
   a recording device configured to record an image on a recording sheet based on image data;
   a reading device configured to read an image on a document;
   a first sheet supporter configured to support the recording sheet;
   a first detector configured to detect an ON state as a state of the first sheet supporter when the recording sheet is present on the first sheet supporter, the first detector being configured to detect an OFF state as the state of the first sheet supporter when the recording sheet is absent on the first sheet supporter;
   a second sheet supporter configured to support the document;
   a second detector configured to detect an ON state as a state of the second sheet supporter when the document is present on the second sheet supporter, the second detector being configured to detect an OFF state as the state of the second sheet supporter when the document is absent on the second sheet supporter;
   a connection device configured to detect an ON state as a state of the connection device when a storage device configured to store image data is connected to the connection device, the connection device being configured to detect an OFF state as the state of the connection device when the storage device is not connected to the connection device;
   a display; and
   a controller configured to perform:
   displaying first notification information on the display when the controller detects one of (i) a switch of the state of the first sheet supporter, which is detected by the first detector, from the OFF state to the ON state, (ii) a switch of the state of the second sheet supporter, which is detected by the second detector, from the OFF state to the ON state, and (iii) a switch of the state of the connection device from the OFF state to the ON state, the first notification information comprising object identification information that identifies a first object and a second object, the first object being an object for which the switch is detected among the first sheet supporter, the second sheet supporter, and the connection device, the second object being an object different from the first object among the first sheet supporter, the second sheet supporter, and the connection device; and
   displaying an acceptance image on the display when a switch of a state of the second object from the OFF state to the ON state is detected in a state in which the first notification information is displayed on the display, the controller being capable of accepting an instruction of execution of a processing to be executed using the first object and the second object while the acceptance image is being displayed on the display.

2. The image processing apparatus according to claim 1, wherein the first notification information further comprises processing identification information that identifies a processing to be executed using (i) the first object for which the switch is detected and (ii) the second object different from the first object.

3. The image processing apparatus according to claim 2, wherein the processing identification information indicates that a switch of the state of the second object from the OFF state to the ON state enables execution of the processing to be executed using the first object and the second object.

4. The image processing apparatus according to claim 1, wherein the controller is configured to display the first notification information for a set length of time.

5. The image processing apparatus according to claim 1, wherein the controller is configured to perform:
   displaying an icon on the display when the switch of the state of the first object is detected in a state in which the state of the second object is in the ON state for greater than or equal to a set length of time; and
   displaying the acceptance image on the display when an input to the icon is detected.

6. The image processing apparatus according to claim 1, wherein the controller is configured to display the acceptance image on the display when the switch of the state of the first object is detected in a state in which the state of the second object is not in the ON state for greater than or equal to a set length of time.

7. The image processing apparatus according to claim 1, wherein the controller is configured to display the acceptance image on the display when the switch of the state of the first object is detected in a state in which the state of the second object is in the ON state for greater than or equal to a set length of time and when the state of the second object is switched from the ON state to the OFF state within the set length of time from the detection of the switch of the state of the first object.

8. The image processing apparatus according to claim 1, wherein the controller is configured to display second notification information on the display when the switch of the state of the first object is detected in a state in which the state of the second object is in the ON state for greater than or equal to a set length of time and when the state of the second object is thereafter switched from the ON state to the OFF state and the ON state in order, and
   wherein the second notification information indicates that the processing to be executed using the first object and the second object is executable.

9. The image processing apparatus according to claim 1, wherein the controller is configured to display information indicating a first processing and information indicating a second processing, when the switch of the state of the first object is detected in a state in which the state of the second object is in the ON state for greater than or equal to a set length of time, wherein the first processing is a processing to be executed using the first object and the second object, and the second processing is a processing to be executed using the first object and a third object that is different from the first object and the second object among the first sheet supporter, the second sheet supporter, and the connection device, and wherein the controller is configured to give a display priority to the information indicating the first processing and give a display priority to the information indicating the second processing, and the display priority given to the information indicating the second processing is greater than the display priority given to the information indicating the first processing.

10. The image processing apparatus according to claim 9, wherein the third object is in the OFF state when the switch of the state of the first object is detected.

11. The image processing apparatus according to claim 1, wherein the processing to be executed using the first object and the second object is at least one of (i) a copy processing in which the reading device reads an image on a document to create image data, and the recording device records the image on a sheet based on the created image data, (ii) a print processing in which the recording device records an image on the sheet based on image data stored in the storage device connected to the connection device, and (iii) a storing processing in which the reading device reads an image on a document to create image data, and the created image data is stored into the storage device connected to the connection device, wherein when the processing to be executed using the first object and the second object is the copy processing, the first object is one of the first sheet supporter and the second sheet supporter, and the second object is another of the first sheet supporter and the second sheet supporter, wherein when the processing to be executed using the first object and the second object is the print processing, the first object is one of the first sheet supporter and the connection device, and the second object is another of the first sheet supporter and the connection device, and wherein when the processing to be executed using the first object and the second object is the storing processing, the first object is one of the second sheet supporter and the connection device, and the second object is another of the second sheet supporter and the connection device.

12. A non-transitory storage medium storing a plurality of instructions to be executed by a processor of an image processing apparatus, the image processing apparatus comprising:

a recording device configured to record an image on a recording sheet based on image data;

a reading device configured to read an image on a document;

a first sheet supporter configured to support the recording sheet;

a first detector configured to detect an ON state as a state of the first sheet supporter when the recording sheet is present on the first sheet supporter, the first detector being configured to detect an OFF state as the state of the first sheet supporter when the recording sheet is absent on the first sheet supporter;

a second sheet supporter configured to support the document;

a second detector configured to detect an ON state as a state of the second sheet supporter when the document is present on the second sheet supporter, the second detector being configured to detect an OFF state as the state of the second sheet supporter when the document is absent on the second sheet supporter;

a connection device configured to detect an ON state as a state of the connection device when a storage device configured to store image data is connected to the connection device, the connection device being configured to detect an OFF state as the state of the connection device when the storage device is not connected to the connection device; and a display, the plurality of instructions, when executed by the processor, causing the image processing apparatus to perform:

displaying first notification information on the display when the controller detects one of (i) a switch of the state of the first sheet supporter, which is detected by the first detector, from the OFF state to the ON state, (ii) a switch of the state of the second sheet supporter, which is detected by the second detector, from the OFF state to the ON state, and (iii) a switch of the state of the connection device from the OFF state to the ON state, the first notification information comprising object identification information that identifies a first object and a second object, the first object being an object for which the switch is detected among the first sheet supporter, the second sheet supporter, and the connection device, the second object being an object different from the first object among the first sheet supporter, the second sheet supporter, and the connection device; and displaying an acceptance image on the display when a switch of a state of the second object from the OFF state to the ON state is detected in a state in which the first notification information is displayed on the display, the image processing apparatus being capable of accepting an instruction of execution of a processing to be executed using the first object and the second object while the acceptance image is being displayed on the display.

\* \* \* \* \*